(12) United States Patent
Chekanov et al.

(10) Patent No.: US 10,077,982 B2
(45) Date of Patent: Sep. 18, 2018

(54) CALIBRATING INERTIAL NAVIGATION DATA USING TIRE PRESSURE MONITORING SYSTEM SIGNALS

(71) Applicant: FREESCALE SEMICONDUCTOR, INC., Austin, TX (US)

(72) Inventors: Albert Stanislavovich Chekanov, Chandler, AZ (US); David Blake Munsinger, Austin, TX (US); Matthew Wayne Muddiman, Gilbert, AZ (US)

(73) Assignee: NXP USA, Inc., Austin, TX (US)

( * ) Notice: Subject to any disclaimer, the term of this patent is extended or adjusted under 35 U.S.C. 154(b) by 59 days.

(21) Appl. No.: 15/276,629

(22) Filed: Sep. 26, 2016

(65) Prior Publication Data
US 2018/0087905 A1 Mar. 29, 2018

(51) Int. Cl.
| | |
|---|---|
| B60T 7/12 | (2006.01) |
| G08G 1/00 | (2006.01) |
| G01S 19/00 | (2010.01) |
| G01C 25/00 | (2006.01) |
| G01C 22/02 | (2006.01) |
| G01C 21/16 | (2006.01) |
| B60C 23/04 | (2006.01) |
| G01C 21/28 | (2006.01) |

(52) U.S. Cl.
CPC .............. *G01C 21/16* (2013.01); *B60C 23/04* (2013.01); *G01C 21/28* (2013.01)

(58) Field of Classification Search
None
See application file for complete search history.

(56) References Cited

U.S. PATENT DOCUMENTS

| | | | |
|---|---|---|---|
| 5,434,788 A | 7/1995 | Seymour et al. | |
| 5,862,511 A | 1/1999 | Croyle et al. | |
| 6,564,148 B2 | 5/2003 | Morgan et al. | |
| 8,467,967 B2 | 6/2013 | Loomis | |
| 9,183,463 B2 | 11/2015 | Steinhardt | |
| 2003/0227380 A1* | 12/2003 | Piech .................. | B60C 23/0408 340/443 |

(Continued)

FOREIGN PATENT DOCUMENTS

| | | |
|---|---|---|
| WO | WO 2004/000578 A2 | 12/2003 |
| WO | WO 2004/000578 A3 | 12/2003 |

(Continued)

*Primary Examiner* — Adam D Tissot
(74) *Attorney, Agent, or Firm* — Charlene R. Jacobsen

(57) ABSTRACT

A system includes a tire pressure monitoring system (TPMS) module coupled with a wheel on a vehicle and a vehicle navigation system of the vehicle. A method entails determining a movement signal at the TPMS module and receiving the movement signal at the vehicle navigation system. The vehicle navigation system includes an inertial sensor system configured to supply motion signals indicative of motion of the vehicle and the vehicle navigation system determines output data in response to the motion signals. The vehicle navigation system output data is calibrated at the vehicle navigation system by utilizing movement signals from the TPMS module to remove an error component from the vehicle navigation system output data. Thus, calibration can be performed in lieu of or in addition to utilizing signals from satellites, which may not be available at all times.

17 Claims, 6 Drawing Sheets

(56) References Cited

U.S. PATENT DOCUMENTS

2012/0022780 A1\* 1/2012 Kulik .................... G01C 21/28
701/498
2014/0195107 A1 7/2014 Park et al.

FOREIGN PATENT DOCUMENTS

WO    WO 2009/129076 A2    10/2009
WO    WO 2009/129076 A3    10/2009

\* cited by examiner

CALIBRATING INERTIAL NAVIGATION DATA USING TIRE PRESSURE MONITORING SYSTEM SIGNALS

TECHNICAL FIELD OF THE INVENTION

The present invention relates generally to vehicle navigation systems for wheeled vehicles. More specifically, the present invention relates to the use of tire pressure monitoring system (TPMS) signals for calibration of inertial navigation data.

BACKGROUND OF THE INVENTION

Vehicle navigation systems based on global positioning system (GPS) receivers have become pervasive in both business and recreational vehicles. Such vehicle navigation systems do not work well, however, when signals from GPS satellites are obscured or unavailable as may happen when driving in a parking garage or tunnel, in urban canyons, and/or near trees due to blocked lines of sight to the satellites or due to multipath propagation.

Accordingly, dead-reckoning is increasingly being implemented in vehicle navigation systems in order to overcome the problems associated with GPS technology alone. In navigation, dead-reckoning is the process of calculating a current position by using a previously determined position, or fix, and advancing that positioning based upon known or estimated speeds over elapsed time and course.

In a vehicle navigation system that uses dead-reckoning, the vehicle is equipped with inertial sensors (e.g., accelerometers and gyroscopes) that know the velocity and direction of travel of the vehicle. Accordingly, such a vehicle navigation system that uses dead-reckoning can be implemented as a supplement to or in lieu of a GPS-based vehicle navigation system. For example, a vehicle navigation system may use a Kalman filter to integrate the always-available sensor data with the accurate but occasionally unavailable GPS position information into a combined fixed position. Alternatively, a vehicle navigation system that uses dead-reckoning can provide navigation data in the event of GPS signal loss.

The sensors used for dead-reckoning typically require recalibration based on GPS velocity and position information. Indeed, in the absence of recalibration signals, a vehicle navigation system that uses dead-reckoning quickly accumulates velocity and position errors due to drift, noise, and a random-walk drift tendency of the accelerometer data that are at levels unacceptable for the purpose of vehicle navigation. Accordingly, periodic recalibration based on GPS data can reduce accumulated position and velocity errors when operating in a dead-reckoning mode utilizing the supplemental inertial sensor measurement system. However, continuous recalibration of the vehicle inertial navigation data based on the GPS data requires sufficient frequency of such recalibration events and, as such, requires high availability of the GPS signal.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

In overview, embodiments disclosed herein entail a system and methodology for calibrating inertial navigation data of a vehicle navigation system using tire pressure monitoring system signals. More particularly, the system and methodology utilizes detected movement signals from one or more tire pressure monitoring system (TPMS) modules in order to verify and calibrate vehicle velocity and vehicle position data output from an inertial sensor system of the vehicle navigation system. The detected movement signals can be radial acceleration, wheel velocity, or rotation rate of the wheel. The movement signals produced by the TPMS modules can provide a reliable estimate of the actual vehicle velocity and the distance traveled even when the vehicle moves in a straight line with near-zero acceleration or when the vehicle travels over rough and inclined terrain in which the inertial sensor system accelerometer readings would typically become unreliable. Further, by utilizing the movement signals from the TPMS modules to calibrate data output from the inertial sensor system of the vehicle navigation system, the requirement for recalibration utilizing global positioning system (GPS) signals is minimized or eliminated. Accordingly, recalibration can occur continuously, even in the absence of GPS signals The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be further understood that the use of relational terms, if any, such as first and second, top and bottom, and the like are used solely to distinguish one from another entity or action without necessarily requiring or implying any actual such relationship or order between such entities or actions.

Figure 1:
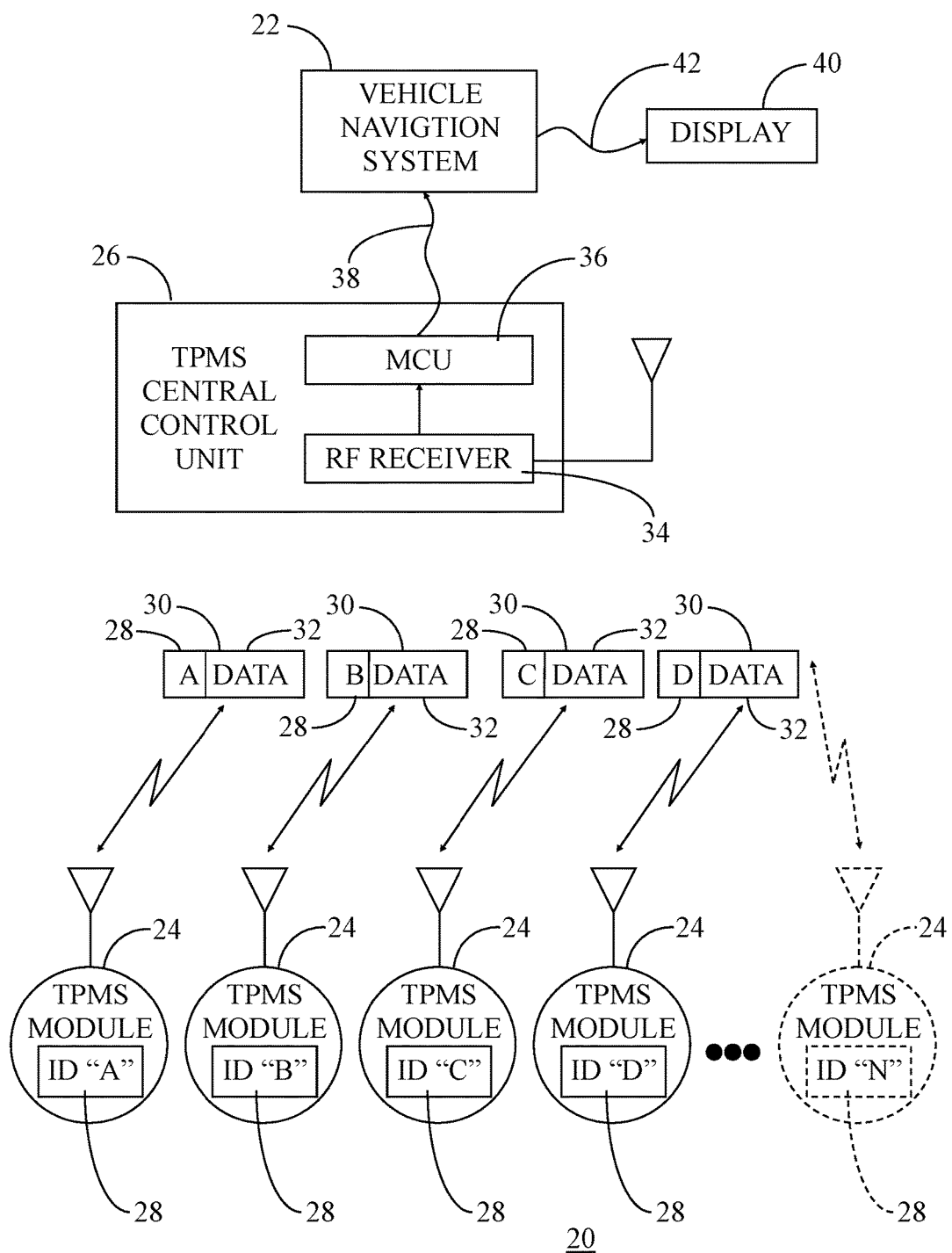
FIG. 1 shows a block diagram of a system for calibrating output data from a vehicle navigation system in accordance with an embodiment.

Referring to FIG. 1, FIG. 1 shows a block diagram of a system 20 for calibrating output data from a vehicle navigation system 22 in accordance with an embodiment. System 20 generally includes vehicle navigation system 22 and a plurality of sensor modules, referred to herein as TPMS modules 24, in radio frequency (RF) communication with a TPMS central control unit 26. Each TPMS module 24 has a unique identifier 28 and is mounted inside of each wheel (not shown), such as on the rim, valve, or in-tire. As will be discussed below, each TPMS module 24 transmits data packets 30 to central control unit 26. Data packets 30 include unique identifier 28 associated with the particular TPMS module 24 and TPMS data 32, examples of which will be described in connection with FIG. 2. FIG. 1 explicitly shows four TPMS modules 24. However, ellipses and one of TPMS modules 24 shown in ghost form indicate that the quantity of TPMS modules 24 coincides with the quantity of wheels on the vehicle.

TPMS central control unit 26 generally includes an RF receiver 34 for receiving data packets 30 and a microcontroller 36 (MCU) in communication with RF receiver 34. In accordance with an embodiment, TPMS central control unit 26 may be in communication with vehicle navigation system 22 via, for example, a serial link 38. In general, data packets 30 are received at RF receiver 34 of TPMS central control unit 26. Thereafter, TPMS central control unit 26 interprets TPMS data 32 and communicates a portion of TPMS data 32 (discussed below) and the associated unique identifier 28 to vehicle navigation system 22 via serial link 38. Additionally, TPMS central control unit 26 may include a memory unit, firmware, software, electronic circuitry, and the like for providing control, tire pressure monitoring, and data manipulation that will not be discussed herein for brevity.

Vehicle navigation system 22 is generally used to find direction in a vehicle. Vehicle navigation system 22 can use a satellite navigation device (e.g., a GPS receiver) to get its position data which is then correlated to a position on a road. Additionally, or alternatively, vehicle navigation system 22 can implement a dead-reckoning strategy in which distance data from an inertial sensor system (e.g., gyroscope and accelerometer) can be used for greater reliability, as GPS signal loss and/or multipath can occur due to urban canyons or tunnels. When directions are needed, the routing can be calculated. This routing information may be presented to the driver on a display unit 40 interconnected with vehicle navigation system 22 via, for example, a serial link 42.

In a vehicle navigation system that employs inertial sensors to perform dead-reckoning, such as vehicle navigation system 22, the inertial sensors require frequent recalibration. In particular, the output data from the inertial sensors used for dead-reckoning quickly accumulates velocity and position errors due to drift, noise, and a random-walk drift tendency of the inertial sensor data. In accordance with an embodiment, periodic recalibration of the inertial sensor data based on TPMS data 32 (described below) can reduce accumulated position and velocity errors on the inertial sensor output data when operating in a dead-reckoning mode without requiring an available GPS signal.

Figure 2:
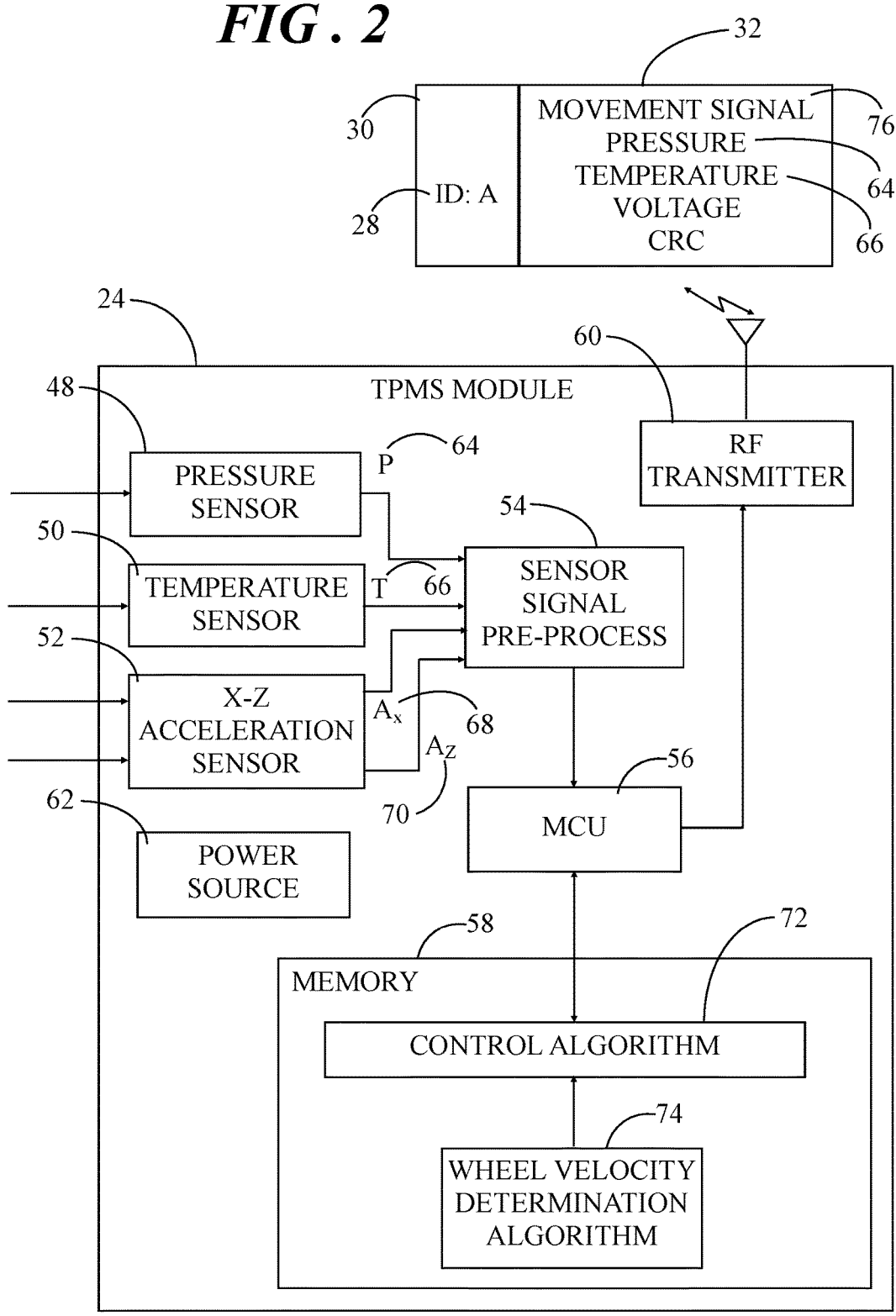
FIG. 2 shows a block diagram of a tire pressure sensor system (TPMS) module of the system of FIG. 1.

FIG. 2 shows a block diagram of one of TPMS modules 24 of system 20 (FIG. 1). TPMS module 22 includes a pressure sensor 48, a temperature sensor 50, and an acceleration sensor 52. TPMS module 22 additionally includes control circuitry such as, for example, sensor signal pre-processing circuitry 54, a microcontroller 56 (MCU), a memory unit 58, an RF transmitter 60, and a power source 62.

Pressure sensor 48 is used to monitor the pressure of the tire and periodically produce a pressure signal 64, P. Temperature sensor 50 is used to monitor the ambient temperature at the tire and periodically produce a temperature signal 66, T. In an embodiment, acceleration sensor 52 is a dual axis accelerometer. Thus, acceleration sensor 52 can be used to detect X-axis acceleration, referred to herein as tangential acceleration, and produce a tangential acceleration signal 68, labeled $A_X$. Additionally, acceleration sensor 52 can be used to detect Z-axis acceleration, referred to herein as radial acceleration, and produce a radial acceleration signal 70, labeled $A_Z$. In some embodiments, tangential and radial acceleration are measured directly. In other configurations, for example, when TPMS modules 22 are implemented as a replacement for the valve stem cap or TPMS modules 22 are affixed to the inside of the tire, the accelerometers will be out-of-plane. That is, tangential and radial accelerations may be suitably computed or processed to obtain tangential and radial signals 68, 70.

In general, pressure signal 64, temperature signal 66, tangential acceleration signal 68, and radial acceleration signal 70 are received at sensor signal pre-processing circuitry 54 where the signals 64, 66, 68, 70 are suitably processed (e.g., filtered, amplified, digitized, etc.). Thereafter, the processed signals 64, 66, 68, 70 are received at and processed by MCU 56. MCU 56 executes a control algorithm 72 to acquire and interpret signals 64, 66, 68, 70 and to enable transmission of data packets 30.

Through the execution of control algorithm 72, a wheel velocity determination algorithm 74 may be executed to determine the velocity of the wheel to which TPMS module is coupled. By way of example, radial acceleration signal 70 may be used to facilitate a determination of the tangential velocity (discussed below) of the wheel. The tangential velocity of the wheel can be used to calibrate output data from an inertial sensor system of vehicle navigation system 22 (FIG. 1). Alternatively or additionally, tangential acceleration signal 68 may be used to facilitate a determination of the angular rotation rate of the wheel to which TPMS module 24 is coupled. Thereafter, the angular rotation rate can be used to determine the tangential velocity of the wheel, and the obtained tangential velocity can be used to calibrate the output data from the inertial sensor system of vehicle navigation system 22. This calibration methodology will be discussed in greater detail below in connection with FIG. 6. Thus, although a dual axis acceleration sensor 52 is shown, alternative embodiments may include a single axis acceleration sensor with Z-axis acceleration detection capability or X-axis acceleration detection capability.

Periodically, RF transmitter 60, in communication with MCU 56, outputs data packets 30. In response to the execution of control algorithm 72, and the associated wheel velocity determination algorithm 74, these data packets 30 can include unique identifier 28 for TPMS module 24 and a movement signal 76 indicative of wheel velocity. Additionally, data packets 30 can include pressure signal 64, temperature signal 66, and so forth. Those skilled in the art will recognize that data packets 30 may include other sensor information detailing, for example, voltage, characteristics of the tire, wheel, environment, and so forth. This additional sensor information is not discussed in detail herein for brevity.

Figure 3:
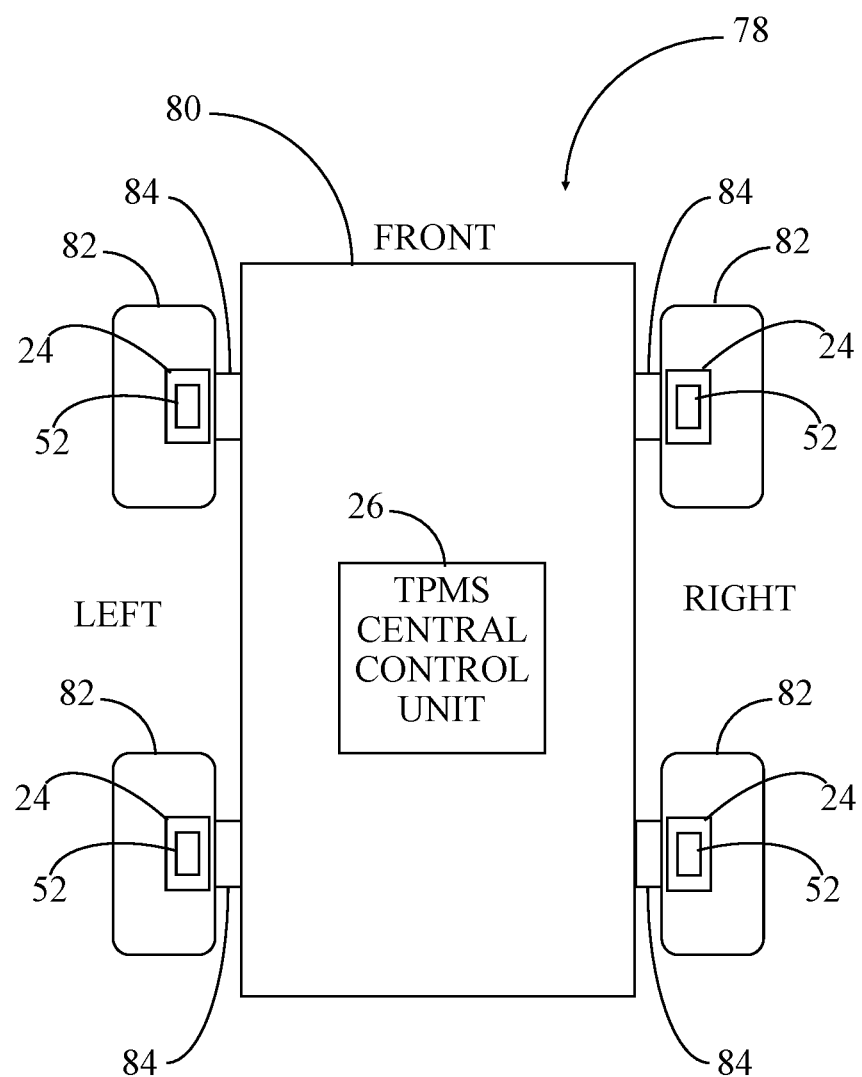
FIG. 3 shows a block diagram of a TPMS system that includes a plurality of TPMS modules implemented in a vehicle.

FIG. 3 shows a block diagram of a tire pressure monitoring system (TPMS) 78 that includes a plurality of TPMS modules 24 and TPMS central control unit 26 implemented in a vehicle 80. In particular, individual wheels 82 are mounted to vehicle 80 via an axle 84, and one each of TPMS modules 24 is associated with one each of wheels 82 of vehicle 80. TPMS central control unit 26 is located at any suitable location within vehicle 80. Acceleration sensor 52 of each respective wheel 82 is suitably mounted to provide tangential acceleration signal 68 and/or radial acceleration signal 70 (FIG. 2) in response to the motion of vehicle 78.

In an example, acceleration sensor 52 of each respective front-right and back-right wheel 82 may be mounted such that a positive X-axis of acceleration sensor 52 is exposed when vehicle 80 moves in a forward direction. Conversely, acceleration sensor 52 of each respective front left and back left wheel 82 may be mounted such that a negative X-axis of acceleration sensor 52 is exposed when vehicle 80 moves in the forward direction.

Accordingly, radial acceleration signal 70 (FIG. 2) is common to all locations of TPMS modules 24, assuming that TPMS modules are mechanically identical in construction, with the Z-axis pointing toward axle 84. However, acceleration sensors 52 incorporated in wheels 82 on the right side of vehicle 80 produce tangential acceleration signal 68 (FIG. 2) that is inverse with respect to tangential acceleration signal 68 produced by acceleration sensors 52 incorporated in wheels 82 on the left side of vehicle 80.

Each TPMS module 24 can assess its rotational dynamics, and in particular tangential acceleration signals 68 and/or radial acceleration signals 70, to determine movement information indicative of the wheel velocity of the wheel to which TPMS 24 is coupled. This movement information can thereafter be transmitted from each TPMS module 24 as movement signal 76 (FIG. 2) in data packets 30 (FIG. 2). Further, TPMS central control unit 26 can forward movement signal 76 and unique identifier 28 (FIG. 2) to vehicle navigation system 22 (FIG. 1), where movement signal 76 can be received and evaluated for calibration of output data (discussed below) determined from motion signals produced by an inertial sensor system of vehicle navigation system 22.

Figure 4:
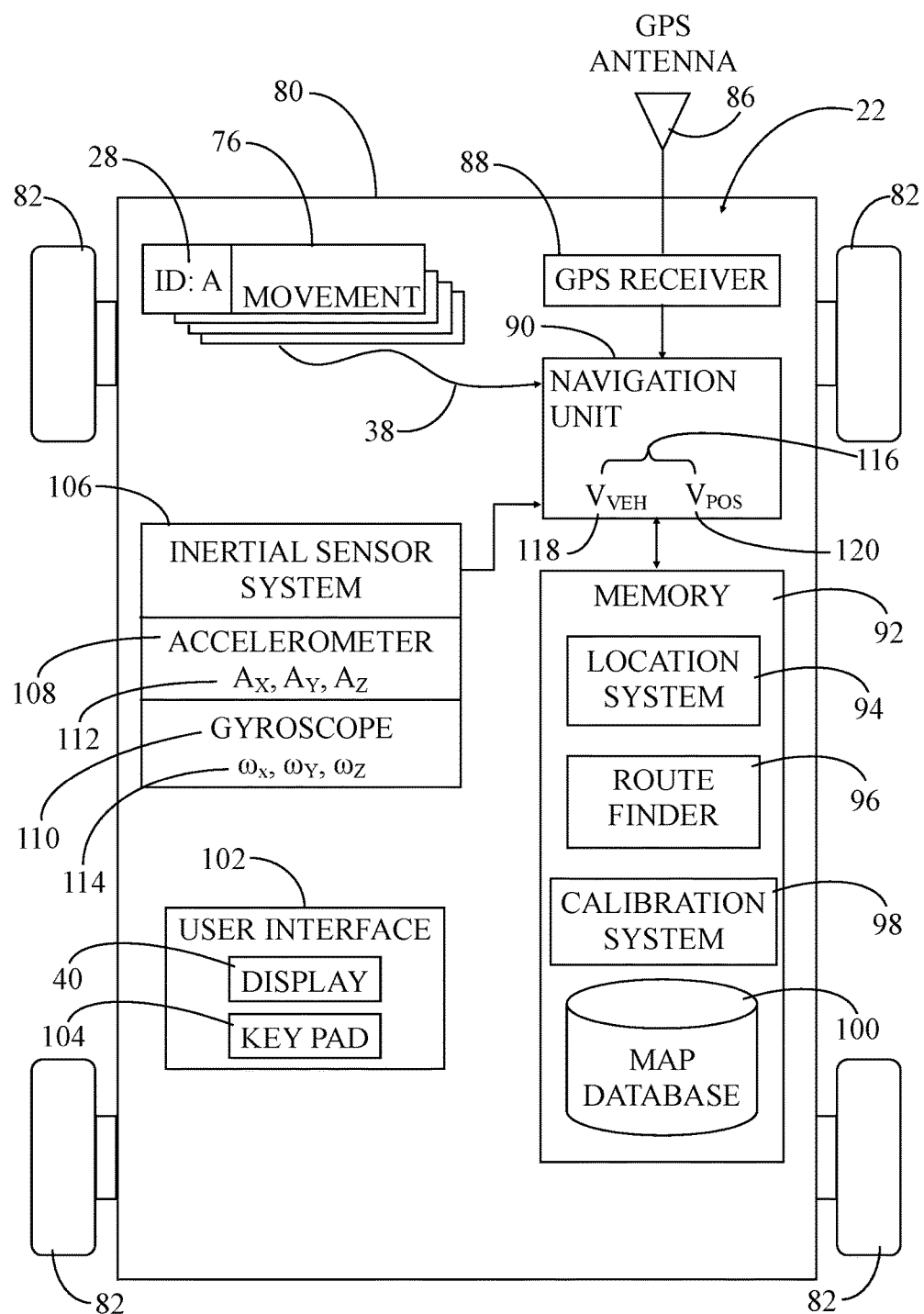
FIG. 4 shows a block diagram of an example arrangement of a vehicle navigation system implemented in the vehicle of FIG. 3.

FIG. 4 shows a block diagram of an example arrangement of vehicle navigation system 22 implemented in vehicle 80. In this example, vehicle navigation system 22 uses a GPS antenna 86 to receive GPS signals. GPS antenna 86 may be connected to a GPS receiver 88. As known to those skilled in the art, GPS receiver 88 can determine geographic position by measuring the ranges (e.g., the distance between a satellite with known coordinates in space and GPS antenna 86) of several satellites and computing the geometric intersection of these ranges. GPS receiver 88 provides GPS measurements to a controller unit, referred to herein as a navigation unit 90.

Navigation unit 90 can include processing circuitry, buses, interface hardware, and related circuitry for performing the location and route finding functions of vehicle navigation system 22. A memory element 92 is in communication with processing unit. Memory element 92 can have various algorithms stored therein. In an example, a location system algorithm 94, a route finder algorithm 96, and a calibration system algorithm 98 may be stored in memory element 92. A map database 100 may additionally be stored in memory element 92. Map database 100 stores map information, such as a road network, and provides the map information to navigation unit 90. A user interface 102, which may include display 40, and a key- or touch-pad 104, and the like, enables interaction between the user and vehicle navigation system 22, such as entry of and tracking to a desired destination.

In an accordance with an embodiment, vehicle navigation system 22 further includes an inertial sensor system 106 in communication with navigation unit 90. Inertial sensor system 106 can include a two or three axis accelerometer 108 that provides motion signals (e.g., acceleration signals) that are indicative of the motion of vehicle 80. Inertial sensor system 106 can additionally include a two or three axis gyroscope 110 that also provides motion signals (e.g., angular velocity signals) that are indicative of the motion of vehicle 80. Inertial sensor system 106 including accelerometer 108 and gyroscope 110 may be relatively low cost six-degree-of-freedom microelectromechanical systems (MEMS) sensors. For simplicity of illustration, the acceleration signals from accelerometer 108 are generally referred to as acceleration signals 112, and are labeled $A_X$, $A_Y$, $A_Z$ in FIG. 4. Similarly, angular velocity signals from gyroscope 112 are generally referred to as angular velocity signals 114, and are labeled $\omega_X$, $\omega_Y$, $\omega_Z$ in FIG. 4. Accordingly, navigation unit 90 can collect and monitor vehicle acceleration signals 112 and angular velocity signals 114 in order to determine, for example vehicle velocity, attitude and position for use as inertial navigation data.

In general, navigation unit 90 executes location system algorithm 94 to evaluate GPS signals from GPS receiver 88 and/or acceleration signals 112 and angular velocity signals 114 from inertial sensor system 106 to propagate vehicle position and therefore track the position of vehicle 80 on a map. Navigation unit 90 further executes route finder algorithm 96 to calculate a route to a destination entered via user interface 102 by a user.

In an embodiment, when GPS signals are unavailable, navigation unit 90 can utilize motion signals (e.g., acceleration signals 112 and angular velocity signals 114) from inertial sensor system 106 to track the position of vehicle 80 using, for example, dead-reckoning methodology in which a current position is calculated by using a previously determined position, or fix, and advancing that positioning based upon known or estimated speeds over elapsed time and course. Thus, the motion signals from inertial sensor system 106 may be used by navigation unit 90 to determine output data 116 in the form of, for example, a current vehicle velocity 118 (labeled $V_{VEH}$), a current vehicle position 120 (labeled $P_{VEH}$), and the like if GPS information is not available. This output data 116 may be utilized during execution of location system algorithm 94 and/or route finder algorithm 96.

As discussed above, sensor errors accumulate rapidly and positioning accuracy degrades quickly when relying on inertial sensor system 106 to determine current vehicle velocity and position 118, 120. Continuous recalibration of output data 116 is therefore performed through the execution of calibration system algorithm 98. In particular, navigation unit 90 calibrates output data 116 by utilizing movement signal 76 from one or more TPMS modules 24 to remove an error component from output data 116. Thus, continuous recalibration of navigation output data 116 can be performed even in the absence of GPS signals. Further, movement signal 76 provides a reliable estimate of vehicle velocity and distance travelled even when vehicle 80 moves in a straight-line with near-zero acceleration or over rough and inclined terrain.

Figure 5:
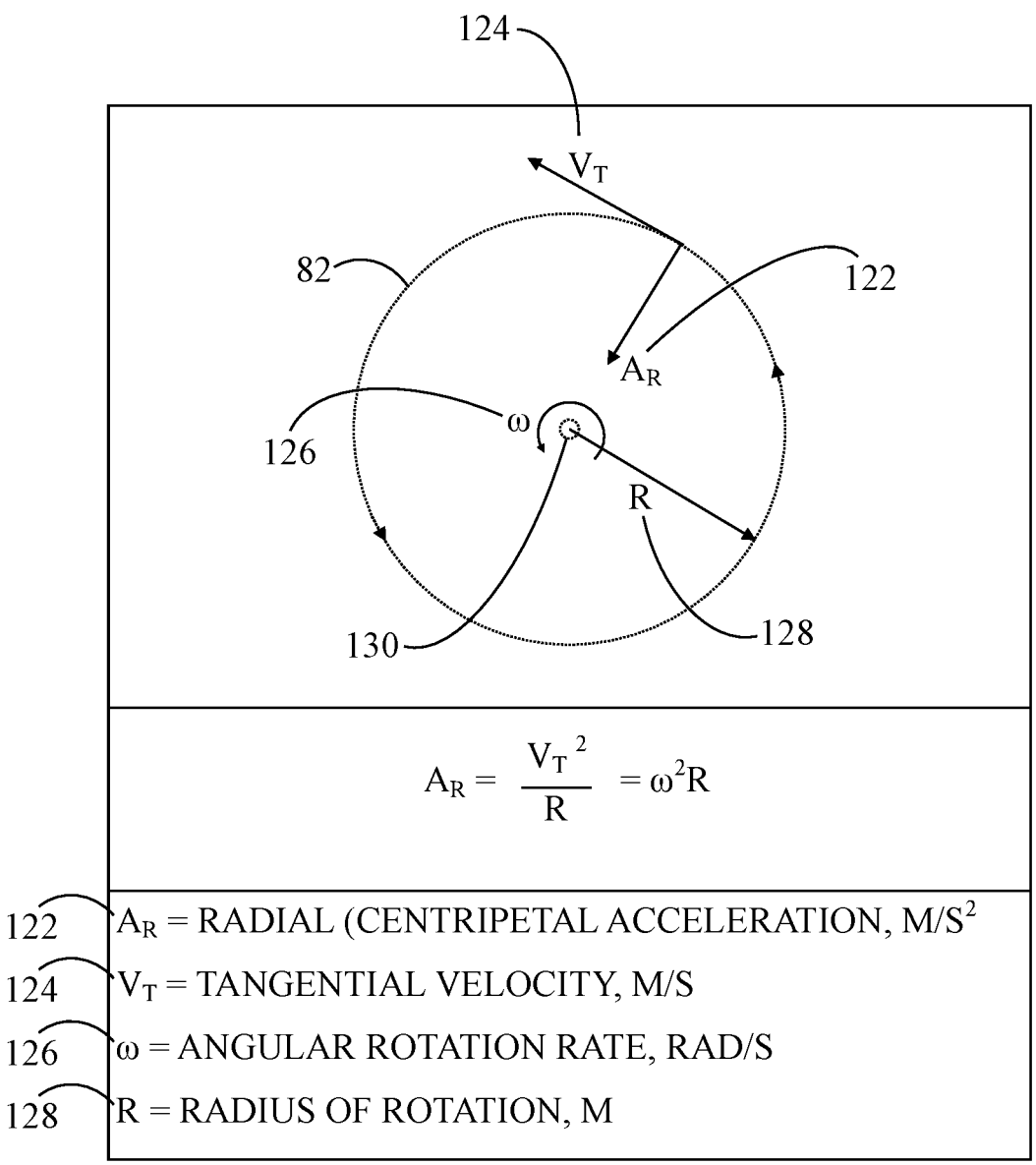
FIG. 5 shows diagram exemplifying a relationship between radial acceleration and tangential velocity in a rotating object.

FIG. 5 shows diagram exemplifying a relationship between radial acceleration 122, labeled $A_R$, and tangential velocity 124, labeled $V_T$, in a rotating object. Further, FIG. 5 shows tangential velocity 124 and radial acceleration 122 in uniform circular motion, an angular rotation rate 126, labeled $\omega$, and a radius of rotation 128, labeled R, in which radius of rotation 128 is the known radius of the rotating body. This relationship is exploited within the calibration methodology in order to utilize movement signal 76 (FIG. 2) in the calibration of output data 116 (FIG. 4) and thereby remove an error component from output data 116.

Circular motion is the movement of an object along the circumference of a circle or rotation along a circular path. Of course, one of wheels 82 (represented by a dotted circle) undergoes circular motion. Since the velocity vector of wheel 82 is constantly changing direction, wheel 82 is undergoing acceleration by a centripetal force in the direction of the center of rotation. Uniform circular motion describes the motion of a body, e.g., wheel 82, traversing a circular path at constant speed. When wheel 82 undergoes circular motion, its distance, i.e. radius of rotation 128, from an axis of rotation 130 remains generally constant. The wheel velocity, e.g., tangential velocity 124, is not constant. Rather, tangential velocity 124 is a vector quantity that depends both on the speed of wheel 82 and its direction of travel. This changing tangential velocity 124 indicates the presence of an acceleration. This acceleration is referred to as radial acceleration 122, or alternatively, a centripetal acceleration. Radial acceleration 122 is of constant magnitude and is directed at all times towards axis of rotation 130.

The acceleration, i.e., radial acceleration 122, due to change in the direction can be characterized by an equation presented in FIG. 5, and is repeated herein as follows:

$$A_R = \frac{V_T^2}{R} = \omega^2 R \qquad (1)$$

In equation (1), $A_R$, is radial (i.e., centripetal) acceleration 122, $V_T$ is tangential velocity 124, R is a radius of rotation 130, and $\omega$ is angular rotation rate 126. In some embodiments, the wheel velocity, referred to herein as tangential velocity 124, can readily be determined from either radial acceleration 122 detected by acceleration sensor as acceleration signal 70, labeled $A_z$ (FIG. 2) or angular rotation rate signal 126.

Figure 6:
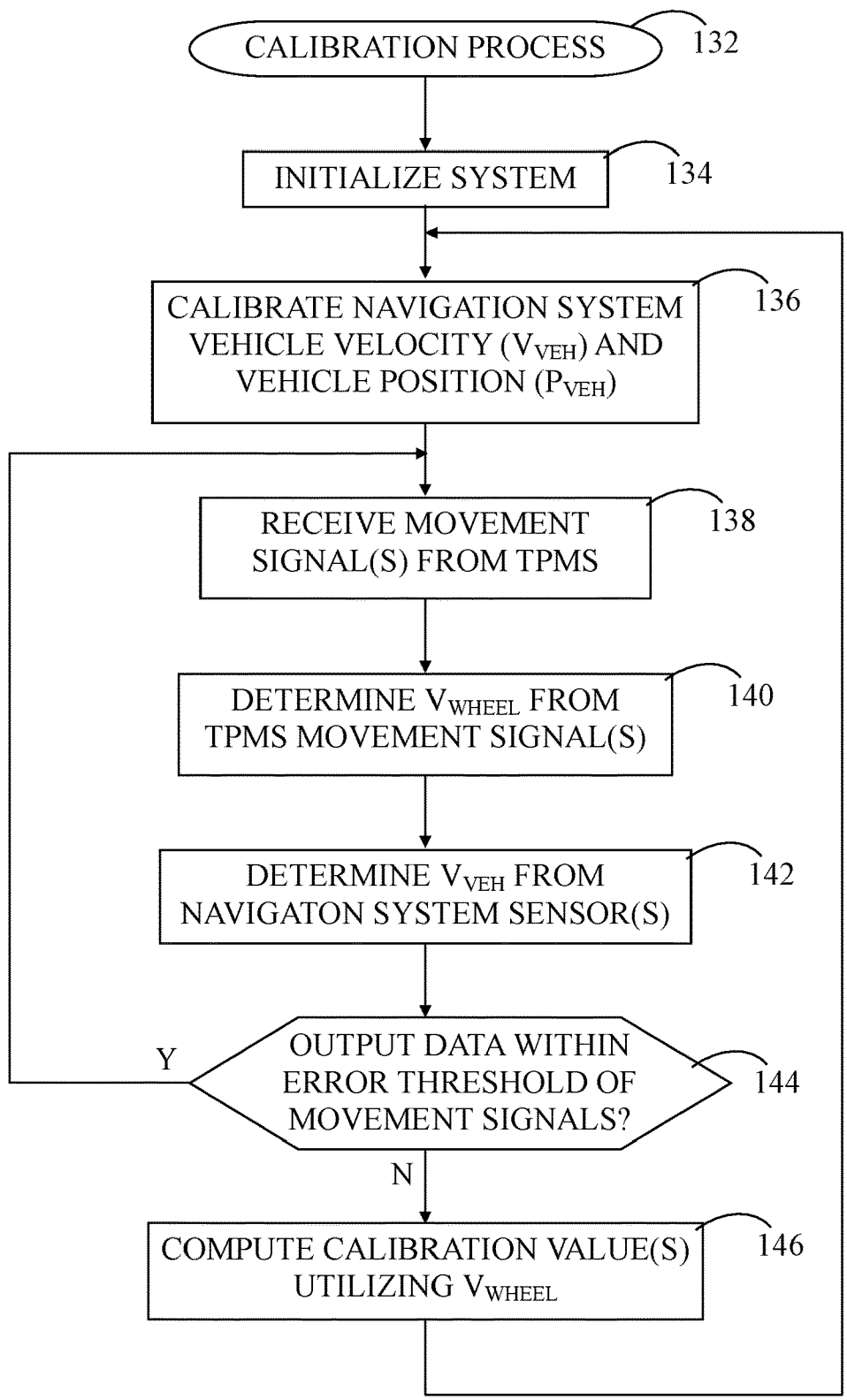
FIG. 6 shows a flowchart of a calibration process in accordance with another embodiment.

Referring now to FIGS. 4 and 6, FIG. 6 shows a flow chart of a calibration process 132 in accordance with another embodiment. In an example, calibration process 132 details the operations performed through the execution of calibration system algorithm 98 by navigation unit 90 of vehicle navigation system 22. Calibration process 132 may be performed continuously to calibrate output data 116 determined by navigation unit 90 in response to motion signals (e.g., acceleration signals 112 and angular velocity signals 114) supplied by inertial sensor system 106. In particular, at a specified sampling interval, calibration process 132 is executed to calibrate, for example, vehicle velocity 118 and vehicle position 120 utilizing movement signals 76 provided by TPMS modules 24 (FIG. 2). Movement signals 76 provide direct information on the actual vehicle velocity and are immune to the problems associated with accelerometer signals 112 from accelerometer 108, such as drift and random-walk.

At a block 134, vehicle navigation system 22 is initialized. System initialization may occur when vehicle 80 (FIG. 4) is first turned on. System initialization may entail obtaining an initial position of vehicle 80 (FIG. 4) in response to GPS signals detected at GPS antenna 86. Additionally, or alternatively, system initialization may entail obtaining an initial position of vehicle 80 based on a last known position of vehicle 80.

At a block 136, the output data 116 (e.g., vehicle velocity 118, $V_{VEH}$, and vehicle position 120, $P_{VEH}$) determined by navigation unit 90 in response to motion signals (e.g., acceleration signals 112 and angular velocity signals 114) is calibrated. At an initial execution of block 136 when vehicle navigation system 22 is initialized, navigation unit 90 may self-calibrate these values in a known manner. For example, navigation unit 90 may calibrate output data in response to stored information and/or by using factory defaults.

At a block 138, navigation unit 90 polls or otherwise receives unique identifiers 28 and movement signals 76 from TPMS central control unit 26 (FIG. 1). Of course, movement signals 76 are indicative of the movement of one of wheels 82 on vehicle 80 that was measured or otherwise detected at TPMS modules 24. Movement signals 76 can be radial acceleration 122 (FIG. 5), tangential velocity 124 (FIG. 5), angular rotation rate 126 (FIG. 5), and the like.

At a block 140, the wheel velocity, $V_{wheel}$, can be determined from movement signals 76. That is, wheel velocity is evaluated based on data from one or more TPMS modules 24 (FIG. 1). By way of example, when tangential velocity 124 is received navigation unit 90, this tangential velocity 124 describes the linear motion of wheel 82, i.e., the wheel velocity, $V_{WHEEL}$. Alternatively, when radial acceleration 122 is received at navigation unit 90, the wheel velocity, $V_{WHEEL}$, can be computed in accordance with equation (1) above. Likewise, when angular rotation rate 126 is received at navigation unit 90, the wheel velocity, $V_{WHEEL}$, can also be computed in accordance with equation (1) above. Alternatively, the wheel velocity, $V_{WHEEL}$, can be obtained from angular rotation rate 126 as:

$$V_{wheel} = 2\pi R * \omega \qquad (2)$$

Further, the following equation characterizes the determination of wheel displacement, i.e., wheel position, from movement signals 76:

$$S = 2\pi R * \omega * \Delta t \qquad (3)$$

In equation (3), S is the travelled path, R is radius of rotation 128 (the wheel radius), $\omega$ is angular rotation rate 126, and $\Delta t$ is the sampling interval. Accordingly, wheel position may also be determined from movement signals 76.

In some embodiments, the change in velocity ($\Delta V$) from the average change in velocity ($\Delta V_{AVG}$) can be monitored for each wheel 82. This value is directly proportional to the deviation ($\Delta R$) of the radius of wheel 82 from average radius of wheel 82 ($\Delta R_{AVG}$). If this value changes, navigation unit 90 could also be alerted to changes in vehicle driving attitude.

Thus, in accordance with blocks 138 and 140, the multiple TPMS modules 24 (FIG. 2) can obtain, measure, and transmit movement signals 76 characterizing radial acceleration 122, tangential velocity 124 (as the wheel velocity), or angular rotation rate 126 for each individual wheel 82 at a specified sampling interval. Navigation unit 90 receives and interprets the movement signal 76. Further, navigation unit 90 can convert tangential velocity 124 data or angular rotation rate 126 data into displacement, S, which can be effectively compared with vehicle position 120, $V_{POS}$, obtained from acceleration signals 112 and/or angular velocity signals 114 produced by inertial sensor system 106.

The availability of movement signals 76 from multiple wheels 82 (e.g., four or more wheels 82) effectively increases the sampling frequency and enables the computation of an averaged movement signal, e.g., an averaged wheel velocity 124 signal. Determination of an averaged wheel velocity 124 can increase robustness and signal-to-noise ratio of the data.

A block 142 is performed concurrent with blocks 138 and 140. At block 142, vehicle velocity 118, $V_{VEH}$, is determined from the motion signals produced by inertial sensor system 106 of vehicle navigation system 22.

At a query block 144, output data 116 determined from the motion signals produced by inertial sensor system 106 is compared with movement signals 76 from TPMS modules 24. For example, vehicle velocity 118, $V_{VEH}$, is compared with the tangential velocity 124 (i.e., the wheel velocity) determined from movement signals 76 provided by TPMS modules 24. Additionally, vehicle position 120, $P_{VEH}$, may be compared with the wheel displacement value determined via equation (3) above. At query block 144, a determination is made as to whether output data 116 falls within predetermined error threshold(s) of movement signals 76.

When output data 116 does not fall within a predetermined error threshold(s), process control continues with a block 146 where calibration value(s) are computed utilizing tangential velocity 124. Thereafter, process control loops back to block 136 in order to calibrate navigation system output data 116 using the computed values and therefore remove an error component from output data 116. However, when output data 116 falls within the predetermined error threshold, recalibration need not occur. Accordingly, process control loops back to block 138 to continue polling or otherwise receiving movement signals 76, comparing output data 116 with TPMS-provided movement signals 76, and performing recalibration as needed. Accordingly, the loop back processing ensures that output data is continuously recalibrated in order to reduce accumulated velocity and position errors without with using GPS signals.

Such a calibration technique utilizing TPMS-provided movement signals 76 can be particularly useful in situations when vehicle 80 moves at a constant speed or over rough or inclined terrain where acceleration signals 112 from inertial sensor system 106 are especially prone to error. Performing continuous correlation of output data 116 with TPMS-provided movement signals 76 can remove uncertainty and drift so as to maintain high positioning precision. Due to the high positioning precision that may be obtained, inertial sensor system 106 may be utilized for navigating vehicle 80 in the absence of GPS signals. Accordingly, such a technique can be highly advantageous for vehicles in remote areas or under driving conditions in which GPS signals are absent or weak. Further, such a technique may be effectively implemented in slow moving, small robotic vehicles that do not rely on the accuracy provided by GPS signals. Such a system would be free of accumulated errors, and could be capable of self-navigating (using map data) for extended distances and time spans.

It is to be understood that certain ones of the process blocks depicted in FIG. 6 may be performed in parallel with each other or with performing other processes. In addition, it is to be understood that the particular ordering of the process blocks depicted in FIG. 6 may be modified, while achieving substantially the same result. Accordingly, such modifications are intended to be included within the scope of the inventive subject matter.

Thus, a system and methodology for calibrating inertial navigation data of a vehicle navigation system using tire pressure monitoring system signals are disclosed herein. An embodiment of a method comprises determining a movement signal at a sensor module coupled with a wheel on a vehicle, receiving, at a vehicle navigation system of the vehicle, the movement signal from the sensor module, wherein the vehicle navigation system includes at least one inertial sensor configured to supply a motion signal indicative of motion of the vehicle, and the vehicle navigation system is configured to determine output data in response to the motion signal, and calibrating, at the vehicle navigation system, the output data by utilizing the movement signal to remove an error component from the output data.

An embodiment of a system comprises a sensor module coupled with a wheel on a vehicle, the sensor module being configured to determine a movement signal for the wheel, and a vehicle navigation system of the vehicle. The vehicle navigation system includes at least one inertial sensor configured to supply a motion signal indicative of motion of the vehicle, and a controller unit in communication with the at least one inertial sensor, the controller unit being configured to receive the motion signal from the at least one inertial sensor and determine output data in response to the motion signal, and the controller unit being further configured to receive the movement signal from the sensor module and calibrate the output data by utilizing the movement signal to remove an error component from the output data.

An embodiment of a method of providing accurate inertial navigation data in a vehicle comprises determining the inertial navigation data at a vehicle navigation system within the vehicle, the vehicle navigation system including at least one inertial sensor configured to supply a motion signal indicative of motion of the vehicle and a controller in communication with the at least one inertial sensor, the controller unit being configured to receive the motion signal from the at least one inertial sensor and determine the inertial navigation data in response to the motion signal, receiving, at the vehicle navigation system of the vehicle, a movement signal from a tire pressure monitoring system (TPMS) module coupled with a wheel on the vehicle, the movement signal being indicative of a tangential velocity of the wheel, and calibrating, at the vehicle navigation system, the inertial navigation data by utilizing the movement signal to remove an error component from the inertial navigation data.

Accordingly, the system and methodology utilize detected movement signals from one or more tire pressure monitoring system (TPMS) modules in order to verify and calibrate vehicle velocity and vehicle position data output from an inertial sensor system of the vehicle navigation system. The detected movement signals can be the wheel velocity or the angular rotation rate of the wheel. The movement signals produced by the TPMS modules can provide a reliable estimate of the actual vehicle velocity and the distance traveled even when the vehicle moves in a straight line with near-zero acceleration or when the vehicle travels over rough and inclined terrain in which the inertial sensor system accelerometer readings would typically become unreliable. Further, by utilizing the movement signals from the TPMS modules to calibrate data output from the inertial sensor system of the vehicle navigation system the requirement for recalibration utilizing global positioning system (GPS) signals is minimized or eliminated. Accordingly, recalibration can occur continuously, even in the absence of GPS signals This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of providing accurate inertial navigation data in a vehicle, said vehicle including a plurality of wheels, one each of said wheels being associated with one each of a plurality of sensor modules, said method comprising:
   determining said inertial navigation data at a vehicle navigation system within said vehicle, said vehicle navigation system including at least one inertial sensor configured to supply a motion signal indicative of motion of said vehicle and a controller in communication with said at least one inertial sensor, said controller unit being configured to receive said motion signal from said at least one inertial sensor and determine said inertial navigation data in response to said motion signal;
   determining movement signals for associated wheels at said plurality of sensor modules;
   receiving, at said vehicle navigation system of said vehicle, said movement signals from said sensor modules; and
   calibrating, at said vehicle navigation system, said inertial navigation data, wherein said calibrating comprises determining an average movement signal value from said movement signals received from said sensor modules and utilizing said average movement signal value to calibrate said inertial navigation data to remove an error component from said inertial navigation data.

2. The method of claim 1 wherein each of said sensor modules includes at least one accelerometer configured to detect radial acceleration of an associated one of said wheels, and said determining said movement signals comprises computing each of said movement signals as a tangential velocity of said associated one of said wheels from said radial acceleration.

3. The method of claim 1 wherein each of said movement signals characterizes a wheel velocity of an associated one of said wheels, said inertial navigation data includes a vehicle velocity, and said calibrating comprises correcting said vehicle velocity in response to a difference between said wheel velocity and said vehicle velocity.

4. The method of claim 1 wherein each of said movement signals characterizes a wheel velocity of an associated one of said wheels, said inertial navigation data includes a vehicle position, and said calibrating comprises deriving a wheel position in response to said wheel velocity and correcting said vehicle position in response to a difference between said wheel position and said vehicle position.

5. The method of claim 1 wherein each of said movement signals characterizes a rotation rate of an associated one of said wheels, said inertial navigation data includes a vehicle velocity, and said calibrating comprises computing a wheel velocity of said associated one of said wheels from said rotation rate and correcting said vehicle velocity in response to a difference between said wheel velocity and said vehicle velocity.

6. The method of claim 1 wherein each of said plurality of sensor modules comprises a tire pressure monitoring system (TPMS) module associated with said one each of said wheels, said TPMS module having a unique identifier, and said receiving includes receiving said unique identifier with each of said movement signals.

7. The method of claim 1 further comprising periodically performing said determining said movement signals, said receiving, and said calibrating operations.

8. The method of claim 1 wherein said vehicle navigation system includes a receiver for receiving signals from a satellite-based navigation system, and said calibrating is performed in lieu of utilizing said satellite-based navigation system for calibration of said output data.

9. A system comprising:
   a plurality of sensor modules, one each of said sensor modules being coupled with one each of a plurality of wheels on a vehicle, and said sensor modules being configured to determine movement signals for associated ones of said wheels; and
   a vehicle navigation system of said vehicle, said vehicle navigation system including:
      at least one inertial sensor configured to supply a motion signal indicative of motion of said vehicle; and
      a controller unit in communication with said at least one inertial sensor, said controller unit being configured to receive said motion signal from said at least one inertial sensor and determine inertial navigation data in response to said motion signal, and said controller unit being further configured to receive said movement signals from said sensor modules, determine an average movement signal value from said movement signals received from said sensor modules, and utilize said average movement signal value to calibrate said inertial navigation data to remove an error component from said inertial navigation data.

10. The system of claim 9 wherein each of said plurality of sensor modules comprises a tire pressure monitoring system (TPMS) module associated with said one each of said wheels.

11. The system of claim 9 wherein each of said sensor modules includes an accelerometer configured to detect radial acceleration of an associated one of said wheels, and one of said controller unit and said sensor module computes said movement signal as a tangential velocity of said associated one of said wheels from said radial acceleration.

12. The system of claim 9 wherein each of said movement signals characterizes a wheel velocity of an associated one of said wheels, said controller unit is configured to determine a vehicle velocity in response to said motion signal, said inertial navigation data includes said vehicle velocity, and said controller unit corrects said vehicle velocity in response to a difference between said wheel velocity and said vehicle velocity.

13. The system of claim 9 wherein each of said movement signals characterizes a wheel velocity of an associated one of said wheels, said controller unit is configured to determine a vehicle position in response to said motion signal, said inertial navigation data includes said vehicle position, and said controller unit is further configured to derive a wheel position in response to said wheel velocity and correct said vehicle position in response to a difference between said wheel position and said vehicle position.

14. The system of claim 9 wherein said vehicle navigation system further comprises a receiver in communication with said controller unit for receiving signals from a satellite-based navigation system, and said controller calibrates said inertial navigation data utilizing said average movement signal value in lieu of utilizing said satellite-based navigation system for calibration of said inertial navigation data.

15. A method of providing accurate inertial navigation data in a vehicle, said vehicle including a plurality of wheels, one each of said wheels being associated with one each of a plurality of tire pressure monitoring system (TPMS) modules, each of said plurality of TPMS modules having a different unique identifier, said method comprising:

determining said inertial navigation data at a vehicle navigation system within said vehicle, said vehicle navigation system including at least one inertial sensor configured to supply a motion signal indicative of motion of said vehicle and a controller in communication with said at least one inertial sensor, said controller unit being configured to receive said motion signal from said at least one inertial sensor and determine said inertial navigation data in response to said motion signal;

receiving a plurality of movement signals at said vehicle navigation system from said TPMS modules, wherein each of said movement signals is accompanied by said unique identifier for an associated one of said TPMS modules, and each of said movement signals is indicative of a tangential velocity of said associated one of said wheels; and calibrating, at said vehicle navigation system, said inertial navigation data, wherein said calibrating comprises determining an average movement signal value from said plurality of movement signals and utilizing said average movement signal value to calibrate said inertial navigation data to remove an error component from said inertial navigation data.

16. The method of claim 15 wherein said vehicle navigation system includes a receiver for receiving signals from a satellite-based navigation system, and said calibrating is performed in lieu of utilizing said satellite-based navigation system for calibration of said inertial navigation data.

17. The method of claim 15 further comprising periodically performing said receiving and calibrating operations to continuously calibrate said inertial navigation data.

* * * * *